United States Patent [19]
Bergen

[11] Patent Number: 5,941,318
[45] Date of Patent: Aug. 24, 1999

[54] CULTIVATOR SWEEP ASSEMBLY

[75] Inventor: Henry John Bergen, Coaldale, Canada

[73] Assignee: Gen Manufacturing Ltd., Coaldale, Canada

[21] Appl. No.: 08/921,404

[22] Filed: Aug. 29, 1997

[51] Int. Cl.⁶ .................................................. A01B 15/02
[52] U.S. Cl. .......................... 172/730; 172/750; 172/762; 403/374.1
[58] Field of Search .................................. 172/762, 753, 172/751, 750, 749, 732, 730, 726, 725, 722, 724, 719, 708, 701.3, 772, 772.5; 403/345, 374, 381, 374.1

[56] References Cited

U.S. PATENT DOCUMENTS

| | | | |
|---|---|---|---|
| 2,097,354 | 10/1937 | Thompson | 172/751 X |
| 2,222,071 | 11/1940 | Gustafson | 172/751 X |
| 2,351,388 | 6/1944 | Baxter . | |
| 2,595,353 | 5/1952 | Graham . | |
| 2,704,499 | 3/1955 | Radway . | |
| 3,038,424 | 6/1962 | Johnson . | |
| 3,104,724 | 9/1963 | Pollock | 172/762 |
| 3,752,236 | 8/1973 | Foster | 172/753 X |
| 4,078,866 | 3/1978 | Hawkins | 172/762 X |
| 4,231,173 | 11/1980 | Davis | 172/762 X |
| 4,333,536 | 6/1982 | Ryan | 172/762 X |
| 4,415,042 | 11/1983 | Cosson | 172/762 X |
| 4,779,686 | 10/1988 | Ryan | 172/762 X |
| 4,787,462 | 11/1988 | Nichols | 172/730 |
| 5,176,209 | 1/1993 | VandenBrink | 172/770 |
| 5,711,378 | 1/1998 | Yeager | 172/762 X |

FOREIGN PATENT DOCUMENTS 221099  3/1959  Australia ............................. 172/749

*Primary Examiner*—Thomas B. Will
*Assistant Examiner*—Christopher J. Novosad
*Attorney, Agent, or Firm*—MacMillan, Sobanski & Todd, LLC

[57] ABSTRACT

A cultivator sweep secured to a sweep holder that is attached to a cultivator implement for shearing surface soil. The cultivator sweep includes a body member having a front nose portion, a rear portion and a pair of laterally outwardly extending wing members. The rear portion includes a slot. The sweep holder includes an insertion member and at least two flanges. The insertion member is received within the slot and the at least two flanges extend outwardly from the insertion member and define grooves to receive the body member. An interference fit is created between the body member of the cultivator sweep and the at least two flanges of the sweep holder to securely retain the cultivator sweep with respect to the sweep holder.

11 Claims, 3 Drawing Sheets

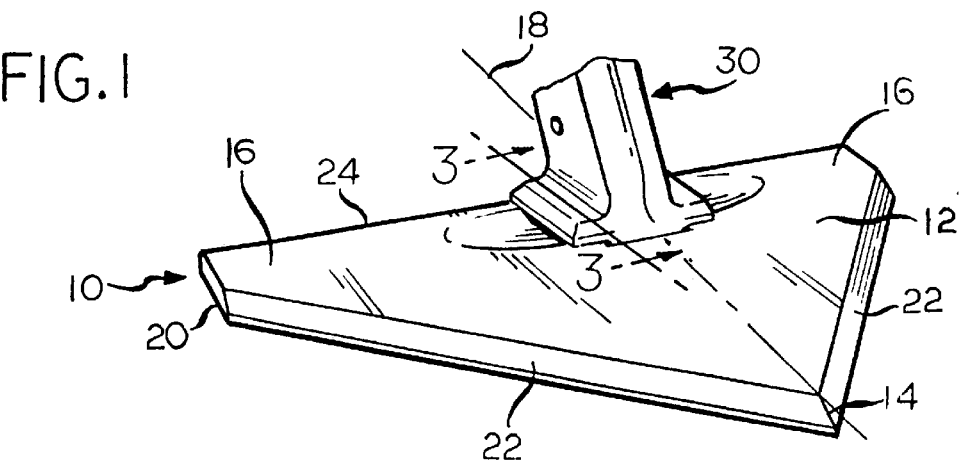
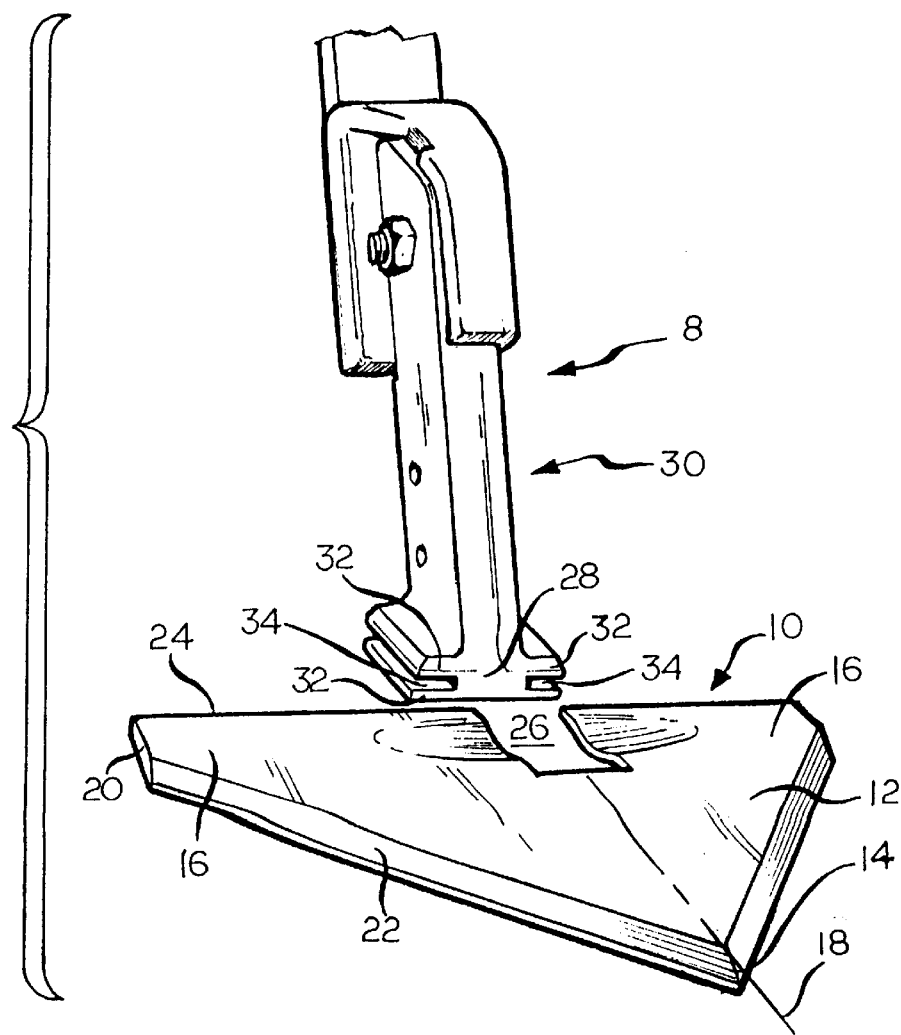

CULTIVATOR SWEEP ASSEMBLY

FIELD OF THE INVENTION

The present invention relates to a cultivator sweep assembly. More particularly, the present invention relates to a cultivator sweep assembly including a cultivator sweep and a sweep holder that may be quickly and easily attached to a cultivator implement without the use of mechanical fasteners such as bolts and nuts and the like.

BACKGROUND OF THE INVENTION

A wide variety of cultivating tools have evolved over the years for the tillage of soil. Such tools have been designed for a variety of purposes and soil conditions. Wing sweeps evolved for the purpose of performing the function of cutting off or uprooting weeds as well as for breaking up or mulching the surface of the soil in order to conserve soil moisture.

Wing sweep designs generally include a forwardly pointed body which is attached to a cultivating implement of some sort. Such wing sweeps include a pair of blades or wings which extend rearwardly from opposite sides of the body, or in some cases, a single blade or wing on one side of the body only. The body wings have customarily been provided with cutting edges extending rearwardly from the point of the body and along the outer front edges of the wings, the wings and the body being shaped so that the cutting edges are in the pattern of a "V" with the apex of the "V" being at the point. In many types of such sweeps, the V-pattern edge lies substantially in a plane. In the transverse direction, the wing or blade inclines upwardly and outwardly from the edge.

Such sweeps are adapted for use on cultivator implements that are drawn by tractors whereby they are propelled at a high forward velocity through the soil and subjected to substantial mechanical strains. Examples of wing sweep designs are disclosed in U.S. Pat. Nos. 5,176,209, 4,787,462 2,351,388, 2,595,353, 2,704,499 and 3,038,424, incorporated herein by reference. As can be seen from these particular prior art patents, the V-shaped wing sweep design as described above is common. The basis for this V-shape design resides in the modern approach to sweep cultivation wherein evaporation of moisture from soil can be reduced if a layer of the surface soil is sliced or sheared off from the underlying soil and then replaced with a minimum of soil agitation with the soil surface being left relatively level without furrows and ridges. The sweep designs of the above-referenced patents contribute to this concept of cultivation and mulching in various ways and include wings that diverge rearwardly in a "V" so that the soil flows rearwardly over the body of the sweep and falls by gravity downwardly between the stem and wings and is not thrown or plowed violently toward the sides. The soil is thus replaced on the ground surface between the wings rearwardly of the sweep and avoids the plowing of the sweep wing portions. It will be appreciated that in the V-shape designs, the nose or tip of the sweep tends to flatten to a very blunt shape. When this occurs drawing of the sweep through the soil can become very difficult since the tip is not sufficiently sharp to cause easy initial separation of the soil and penetration of the sweep through the soil. Another wear characteristic of the existing sweep designs is that such sweeps also tend to wear faster at the distal tip portions of the wings as opposed to the center of the wings. This wearing of the end portions of the wings tends to reduce the width of the sweep during its lifetime, thus narrowing the path which the sweep makes through the soil. Since the purpose of the sweep is to shear as much surface soil as possible at one time, this narrowing of the sweep reduces the effectiveness and efficiency of the cultivating tool carrying the sweep or a plurality of such sweeps.

Finally, sweeps have incorporated a cutting edge inclined to the surface of the ground in order to increase the penetration and cutting capability of the sweep. In order to increase the angle of inclination to the ground, the rear portions of the wing members have generally been designed to be uplifted relative to the ground surface as in U.S. Pat. Nos. 2,351,388 and 2,704,499, incorporated herein by reference. A problem with such uplifting of the rear portion of the sweep is that it will achieve better penetration into the ground, the elevation of the rear portion of the sweep will tend to increase the agitation of the soil.

The cultivator sweeps such as disclosed in U.S. Pat. No. 4,787,462 include a stem designed to attach the cultivator sweep to a support member of a cultivating implement. The stem attaches over a vertical shank of a standard cultivating implement. A problem with such attachment is that the cultivator sweep is mechanically fastened to the vertical shank and can come loose and fall off the vertical shank. Furthermore, the mechanical fastener must be either loosened and/or tightened to remove and/or attach the cultivator sweep to the vertical shank thereby increasing downtime of the cultivating implement.

Although the various cultivator sweep assembly designs have been proven to perform satisfactorily, further improvements on the design of cultivator sweeps is desired. An object of the present invention is to provide a cultivator sweep assembly including a cultivator sweep and sweep holder that is simple to attach and economical to make. Yet another object of the present invention is to provide a cultivator sweep assembly that is secured to a sweep holder by an interference fit. Still another object of the present invention is to provide a cultivator sweep assembly that is secured to a sweep holder and is retained against the sweep holder by the action of the cultivator sweep passing through the soil.

SUMMARY OF THE INVENTION

Briefly, there is provided a cultivator sweep assembly including a cultivator sweep that is secured to a sweep holder that is attached to a cultivator implement for shearing surface soil. The cultivator sweep includes a body member having a front nose portion, a rear portion and a pair of laterally outwardly extending wing members. The rear portion includes a slot. The sweep holder includes an insertion member and at least two flanges. The insertion member is received within the slot and the at least two flanges extend outwardly from the insertion member and define grooves to receive the body member. An interference fit is created between the body member of the cultivator sweep and the at least two flanges of the sweep holder to securely retain the cultivator sweep with respect to the sweep holder.

DESCRIPTION OF THE DRAWINGS

Further features and other objects and advantages of this invention will become clear from the following detailed description made with reference to the drawings in which:

FIG. 1 is a partial perspective view of a sweep holder and a cultivator sweep;

FIG. 2 is a partial exploded view of a cultivator implement, sweep holder and cultivator sweep.

DETAILED DESCRIPTION OF THE INVENTION

Figure 3:
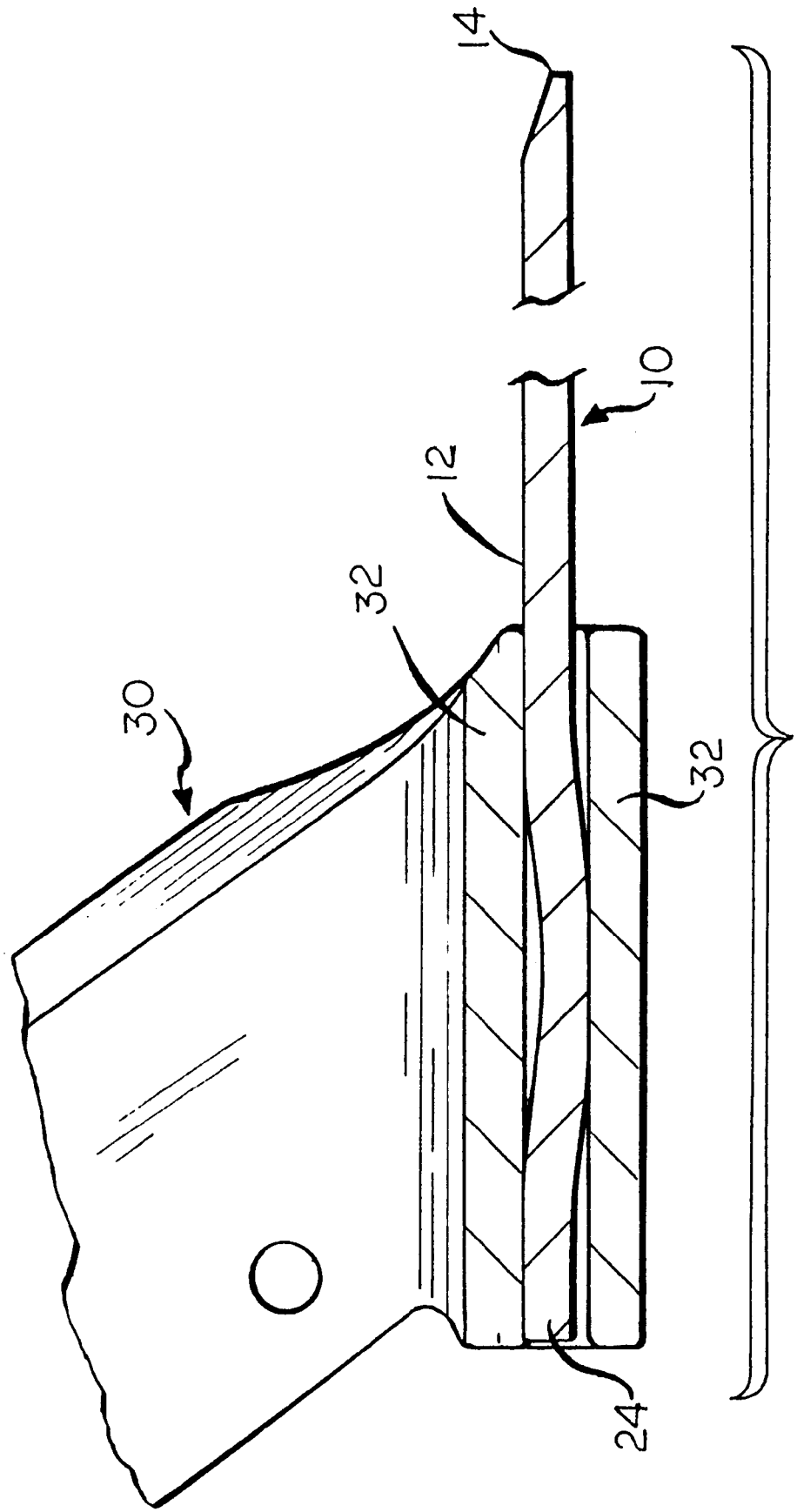
FIG. 3 is an enlarged cross sectional view taken along line 3—3 of FIG. 1.
Figure 4:
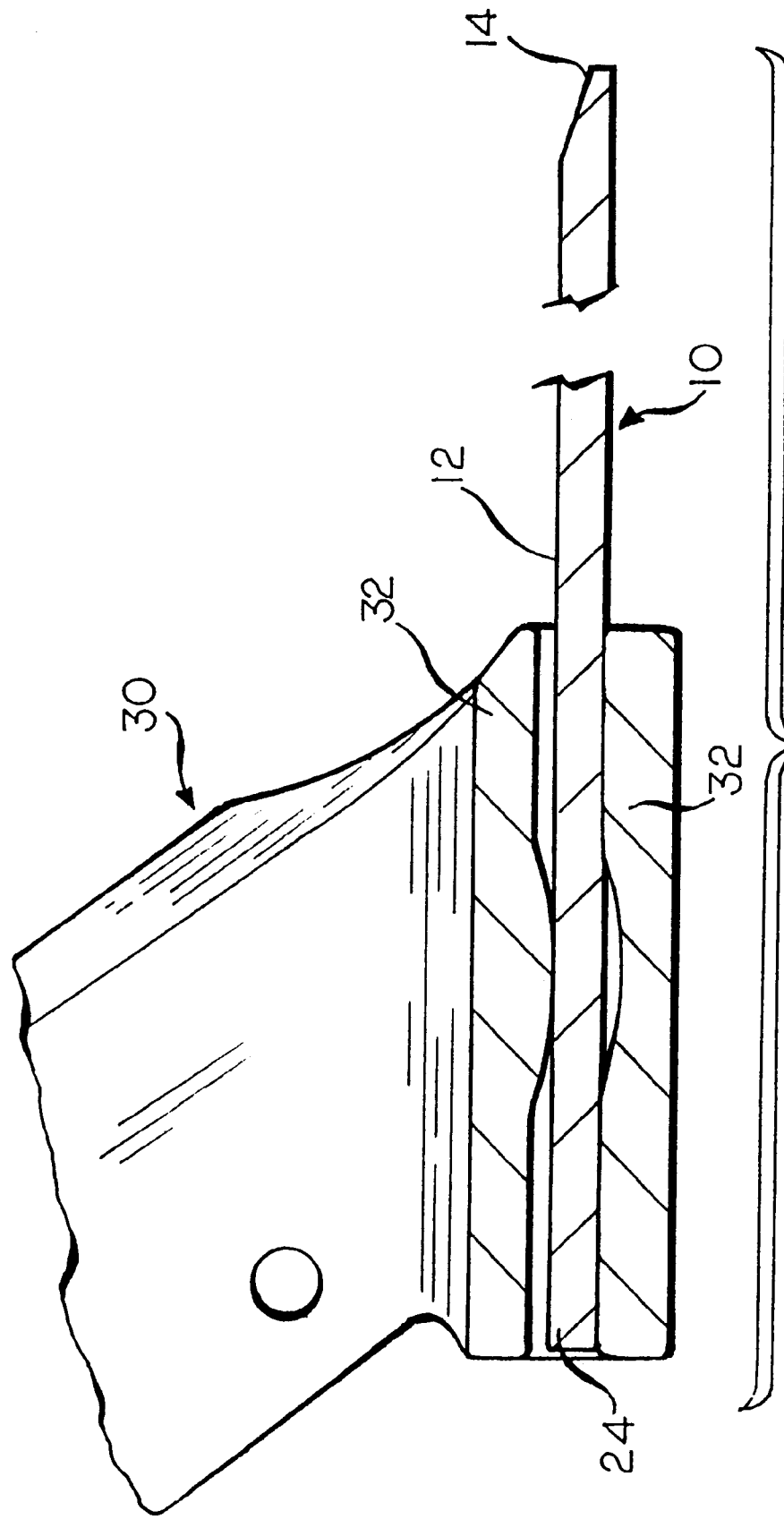
FIG. 4 is an enlarged cross sectional view showing an alternative embodiment of the invention wherein two flanges of a sweep holder are contoured to provide an interference fit with a body member.

In the following description, like reference characters designate like or corresponding parts. Also in the following description, it is to be understood that such terms as "forwardly", "rearwardly" and the like, are words of convenience.

Referring to the figures, there is shown a cultivator sweep assembly 8 including a cultivator sweep 10 and a sweep holder 30. The cultivator sweep 10 includes a body member 12 which is elongated and forwardly pointed and terminates in a front nose portion 14. A pair of wing members 16 extend laterally outwardly from the body member 12 and diverge rearwardly to a longitudinal axis 18 of the body member. The longitudinal axis 18 defines the line of travel for the cultivator sweep 10, and each wing member 16 is preferably a mirror image of the wing on the opposite side of the axis. The wing members 16 join each other along the axis 18 to form the front nose portion 14 at the forward, innermost ends thereof. The outermost or distal ends of the wing members 16 terminate along flat edge surfaces 20. The edge surfaces 20 are preferably aligned substantially parallel with the longitudinal axis 18. A forward edge 22 of each wing member 16 may include a cutting surface of a type well known in the art. The forward edge 22 of each wing member 16 is substantially steeper than the plane of the ground surface and the more rearwardly disposed portions of each wing member.

Disposed along the longitudinal axis 18 of the body member 12 and extending from a rear portion having a rear edge 24 of the body member is a slot 26. Although the slot 26 is shown as a rectangular shaped slot, the slot may be of most any suitable shape and size to receive an insertion member 28 as more fully described herein. For example, the slot 26 may be triangular, semi-circular or semi-oval shaped and the like.

The cultivator sweep 10 is adapted to be secured to a sweep holder 30 which in turn is secured to a cultivator implement (not shown) of a type well known in the art. It will be appreciated that the sweep holder 30 may be formed integral with the cultivator implement or mechanically fastened to the cultivator implement as well known in the art. The cultivator sweep 10 and/or the sweep holder 30 may be formed of most any suitable material, such as high grade steel materials and the like, using metallurgy techniques well known in the art.

The sweep holder 30 includes an insertion member 28 and at least two flanges 32. The insertion member 28 is of a size and shape to fit within the corresponding slot 26 of the cultivator sweep 10. The flanges 32 extend outwardly from the insertion member 28 and define grooves 34 adapted to receive the body member 12 of the cultivator sweep 10.

It will be appreciated that the sweep holder 30 may include one or more grooves 34 to provide for multiple possible attachment positions of the cultivator sweep with respect to the sweep holder. For example, the grooves 34 may extend transversely across the longitudinal dimension of the sweep holder 30 such that during normal operation of the cultivator sweep assembly the grooves 34 of the sweep holder 30 will be oriented substantially parallel to a plane of the ground surface.

The cultivator sweep 10 is attached to the sweep holder 30 by sliding the insertion member 28 within the slot 26 and the body member 12 of the cultivator sweep within the grooves 34 formed by the flanges 32. An interference fit is created between the body member 12 of the cultivator sweep 10 and the flanges 32 of the sweep holder 30 to securely retain the cultivator sweep with respect to the sweep holder. As used herein the term interference fit refers to a frictional locking fit between the members.

As shown in FIG. 3, an area of the body member 12 proximate the slot 26 is contoured to provide an interference fit with the sweep holder 30 and lock the cultivator sweep 10 to the sweep holder. It will be appreciated that the flanges 32 may also be contoured either in place of, or in addition to, the cultivator sweep to provide an interference fit.

In a preferred embodiment, the longitudinal length of the flanges 32 and the grooves 34 are formed such that during operation of the cultivator sweep 10, the cultivator sweep is pushed rearward against the sweep holder 30 by the action of the cultivator sweep through the soil. In a most preferred embodiment, the longitudinal length of the flanges 32 and the grooves 34 are formed substantially parallel to a top plane formed by the soil surface. It will be appreciated that because the cultivator sweep 10 moves forward against the soil and substantially parallel to the horizontal soil surface during operation, the cultivator sweep 10 is pushed against the sweep holder 30 and will not dislodge from the sweep holder as may occur with vertically tapered, wedge mounted cultivator sweeps.

As shown in the figures, the slot 26, grooves 34 and insertion member 28 cooperatively stabilize and lock the cultivator sweep 10 with respect to the cultivator implement. Furthermore, because of the slide-on attachment design of the cultivator sweep 10, the sweep holder 30 may be formed with a substantially lower profile than heretofore known sweep holders thereby disturbing the soil less as the cultivator sweep is pulled through the soil. For example, the sweep holder may be as narrow as about ¾ of an inch in thickness and still provide sufficient strength. Moreover, the slide-on attachment design facilitates ease of replacement of the cultivator sweep without the use of mechanical fasteners.

The documents, patents and patent applications referred to herein are hereby incorporated by reference.

Having described presently preferred embodiments of the invention, it is to be understood that it may be otherwise embodied within the scope of the appended claims.

What is claimed is:

1. A cultivator sweep assembly that is capable of being attached to a cultivator implement for shearing surface soil, comprising:

a cultivator sweep including a body member having a front nose portion, a rear portion having a rear edge and a pair of laterally outwardly extending wing members, said body member having a slot extending through said rear edge toward said front nose portion; and a vertically extending sweep holder including an insertion member having a front, back and opposing sides and at least two flanges extending laterally outwardly from each side and defining a groove, wherein said insertion member is received within said slot of said body member and said body member of said cultivator sweep is received between said at least two flanges, wherein at least one of said body member and said at least two flanges are contoured to create an interference fit between said body member and said at least two flanges of said sweep holder to securely retain said cultivator sweep with respect to said sweep holder.

2. The cultivator sweep assembly of claim 1 wherein an area of said body member proximate said slot is contoured to provide an interference fit with said sweep holder.

3. The cultivator sweep assembly of claim 1 wherein said at least two flanges are contoured to provide an interference fit with said body member.

4. The cultivator sweep assembly of claim 1 wherein each said groove extends transversely across a longitudinal dimension of the sweep holder such that during normal operation of the cultivator sweep assembly the grooves of the sweep holder will be oriented substantially parallel to a plane of the ground surface.

5. The cultivator sweep assembly of claim 1 wherein said body member includes a longitudinal axis and said slot is disposed along said longitudinal axis.

6. The cultivator sweep assembly of claim 5 wherein said slot is a rectangular shaped slot.

7. The cultivator sweep assembly of claim 1 wherein each said wing member is a mirror image of a wing member disposed on an opposite side of a longitudinal axis of said body member.

8. The cultivator sweep assembly of claim 1 wherein said wing members include a forward edge having a cutting surface.

9. The cultivator sweep assembly of claim 1 wherein said insertion member is of a size and shape to match an opening within said slot of said cultivator sweep.

10. A cultivator sweep assembly that is capable of being attached to a cultivator implement for shearing surface soil, comprising:

a cultivator sweep including a body member having a front nose portion, a rear portion and a pair of laterally outwardly extending wing members, said body member having a slot extending through said rear portion toward said front nose portion; and a vertically extending sweep holder including an insertion member having a front, back and opposing sides and at least two flanges extending laterally outwardly from each side and defining a groove, wherein said insertion member is received within said slot of said body member and sail body member of said cultivator sweep is received between said at least two flanges, wherein at least one of said body member and said at least two flanges are contoured to create an interference fit between said body member and said at least two flanges of said sweep holder to securely retain said cultivator sweep with respect to said sweep holder, wherein said at least two flanges are contoured to provide an interference fit with said body member.

11. A cultivator sweep assembly that is capable of being attached to a cultivator implement for shearing surface soil, comprising:

a cultivator sweep including a body member having a front nose portion, a rear portion and a pair of laterally outwardly extending wing members, said body member having a slot extending through said rear portion toward said front nose portion; and a vertically extending sweep holder including an insertion member having a front, back and opposing sides and at least two flanges extending laterally outwardly from each side and defining a groove, wherein said insertion member is received within said slot of said body member and said body member of said cultivator sweep is received between said at least two flanges, wherein at least one of said body member and said at least two flanges are contoured to create an interference fit between said body member and said at least two flanges of said sweep holder to securely retain said cultivator sweep with respect to said sweep holder, wherein said slot is a rectangular shaped slot.

* * * * *